(12) United States Patent
Biederman et al.

(10) Patent No.: US 7,836,336 B2
(45) Date of Patent: Nov. 16, 2010

(54) REDUNDANT POWER AND DATA OVER A WIRED DATA TELECOMMUNICATIONS NETWORK

(75) Inventors: Daniel Biederman, San Jose, CA (US); Kenneth Coley, Campbell, CA (US); Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/580,415

(22) Filed: Oct. 16, 2009

(65) Prior Publication Data

US 2010/0037093 A1 Feb. 11, 2010

Related U.S. Application Data

(62) Division of application No. 10/961,243, filed on Oct. 7, 2004, now Pat. No. 7,620,846.

(51) Int. Cl.
*G06F 11/00* (2006.01)
(52) U.S. Cl. ....................................................... 714/14
(58) Field of Classification Search .................. 714/14
See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |

(Continued)

FOREIGN PATENT DOCUMENTS

WO    WO96/23377    8/1996

OTHER PUBLICATIONS

"IEEE Standard 802.3af", IEEE Standard for Information Technology-Telecommunications and Information Exchange Between Systems-Local and Metropolitan Area Network-Specific Requirement, IEEE The Institute of Electrical and Electronics Engineering, Inc., Jun. 18, 2003.

(Continued)

*Primary Examiner*—Michael C Maskulinski
(74) *Attorney, Agent, or Firm*—BainwoodHuang

(57) ABSTRACT

A method and apparatus for redundant power and data over a wired data telecommunications network permits power to be received at a local powered device (PD) from remote power sourcing equipment (PSE) via at least one conductor at a first time and power and/or data to be obtained by the local device from another port of the remote device or another remote device at a second different time. Power levels obtained may be adjusted from time to time in response to circumstances.

20 Claims, 11 Drawing Sheets

U.S. PATENT DOCUMENTS

| | | | |
|---|---|---|---|
| 5,639,267 | A | 6/1997 | Loudermilk |
| 5,726,506 | A | 3/1998 | Wood |
| 5,742,513 | A | 4/1998 | Bouhenguel et al. |
| 5,758,102 | A | 5/1998 | Carey et al. |
| 5,775,946 | A | 7/1998 | Briones |
| 5,790,391 | A | 8/1998 | Stich et al. |
| 5,790,873 | A | 8/1998 | Popper et al. |
| 5,793,987 | A | 8/1998 | Quackenbush et al. |
| 5,796,185 | A | 8/1998 | Takata et al. |
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,643,566 | B1 | 11/2003 | Lehr et al. |
| 6,701,443 | B1 | 3/2004 | Bell |
| 6,762,675 | B1 | 7/2004 | Cafiero et al. |
| 6,764,343 | B2 | 7/2004 | Ferentz |
| 6,804,351 | B1 | 10/2004 | Karam |
| 6,958,699 | B1 | 10/2005 | Karam |
| 6,986,071 | B2 | 1/2006 | Darshan et al. |
| 7,089,126 | B2 | 8/2006 | Muir |
| 7,145,439 | B2 | 12/2006 | Darshan et al. |
| 7,154,381 | B2 | 12/2006 | Lang et al. |
| 7,159,129 | B2 | 1/2007 | Pincu et al. |
| 7,162,377 | B2 | 1/2007 | Amrod et al. |
| 2004/0049321 | A1 | 3/2004 | Lehr et al. |
| 2004/0073597 | A1 | 4/2004 | Caveney et al. |
| 2004/0146061 | A1 | 7/2004 | Bisceglia et al. |
| 2004/0230846 | A1* | 11/2004 | Mancey et al. ............... 713/300 |
| 2004/0260794 | A1 | 12/2004 | Ferentz et al. |
| 2005/0132240 | A1 | 6/2005 | Stineman, Jr. et al. |
| 2005/0141431 | A1 | 6/2005 | Caveney et al. |
| 2005/0197094 | A1 | 9/2005 | Darshan et al. |
| 2005/0257262 | A1 | 11/2005 | Matityahu et al. |
| 2005/0272402 | A1* | 12/2005 | Ferentz et al. ............... 455/402 |
| 2006/0019629 | A1 | 1/2006 | Berson et al. |
| 2008/0077811 | A1* | 3/2008 | Dove ......................... 713/300 |
| 2008/0113560 | A1 | 5/2008 | Caveney et al. |

OTHER PUBLICATIONS

"3 Com NJ100 Network Jack Power", printed from http://www.poweroverethernet.com/manual/content/view/full/776, 3Com, Tuesday, Mar. 18, 2003.

3Com User Guide-3Com IntelliJack, Model NJ220, Version 1.0, 3Com, Nov. 2003.

International Search Report for International Application No. PCT/US2005/0363392, date of mailing Mar. 10, 2006.

"3Com User Guide", 3Com Network Jack, Model NJ200, Version 1.0, 3Com, Sep. 2002.

International Search Report for International Application No. PCT/US2005/036329, date of mailing Sep. 4, 2006.

International Preliminary Report on Patentability Application No. PCT/US2005/036328, date of mailing May 18, 2007.

Lynn, K., "Universal Serial Bus (USB) Power Management", Wescon Conference, IEEE, Sep. 1998, pp. 194-201.

International Search Report for International Application No. PCT/US2005/036328, date of mailing Aug. 3, 2006.

Invitation to Pay Additional Fee (Partial International Search), Application No. PCT/US2005/036238, date of mailing May 26, 2006.

Mendelson, G., White Paper "All You Need to Know About Power Over Ethernet (PoE) and the IEEE 802.3af Standard", pp. 1-24, Jun. 2004.

\* cited by examiner

REDUNDANT POWER AND DATA OVER A WIRED DATA TELECOMMUNICATIONS NETWORK

CROSS REFERENCE TO RELATED APPLICATIONS

This Patent Application is a Divisional of U.S. patent application Ser. No. 10/961,243 filed on Oct. 7, 2004, entitled, "REDUNDANT POWER AND DATA OVER A WIRED DATA TELECOMMUNICATIONS NETWORK", the contents and teachings of which are hereby incorporated by reference in their entirety.

STATEMENT OF RELATED CASES

This patent may be considered to be related to commonly owned U.S. Pat. No. 7,363,525 filed on Oct. 7, 2004, issued on Apr. 22, 2008, and entitled "Bidirectional Inline Power Port" in the names of inventors Daniel Biederman, Kenneth Coley and Frederick R. Schindler.

This patent may also be considered to be related to commonly owned U.S. patent application Ser. No. 10/961,904 filed on Oct. 7, 2004 and entitled "Inline Power-Based Common Mode Communication in a Wired Data Telecommunications Network" in the name of inventors Roger A. Karam, Frederick R. Schindler and Wael William Diab.

This patent may also be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero.

This patent may also be considered to be related to commonly owned U.S. patent application Ser. No. 10/982,383 filed on Nov. 5, 2004 and entitled "Power Management for Serial-Powered Device Connections" in the name of inventor Roger A. Karam.

This patent is may also be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca-Cafiero.

This patent may also be considered to be related to commonly owned U.S. patent application Ser. No. 11/000,734 filed on Nov. 30, 2004 entitled "Power and Data Redundancy in a Single Wiring Closet" in the names of inventors Roger A. Karam and Luca Cafiero.

This patent may also be considered to be related to commonly owned U.S. patent application Ser. No. 10/981,203 filed on Nov. 3, 2004 entitled "Powered Device Classification In A Wired Data Telecommunications Network" in the name of inventor Roger A. Karam.

This patent may also be considered to be related to commonly owned U.S. Pat. No. 7,457,252 filed on Nov. 3, 2004, issued on Nov. 25, 2008, and entitled "PHY-Based Current Imbalance Compensation for Magnetics in a Wired Data Telecommunications Network" in the names of inventors Roger A. Karam and John F. Wakerly.

This patent may be considered to be related to commonly owned U.S. patent application Ser. No. 10/845,021 filed May 13, 2004 and entitled "Power Delivery over Ethernet Cables" in the names of inventors Wael William Diab and Frederick R. Schindler.

This patent may be considered to be related to commonly owned U.S. Pat. No. 6,541,878, issued Apr. 1, 2003, and entitled "Integrated RJ-45 Magnetics with Phantom Power Provision" in the name of inventor Wael William Diab.

This patent may be considered to be related to commonly owned U.S. Pat. No. 7,353,407 filed on May 20, 2004, issued on Apr. 1, 2008, and entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND

Inline Power (also known as Power over Ethernet and PoE) is a technology for providing electrical power over a wired data telecommunications network (such as, for example, the well-known Ethernet) from power source equipment (PSE) to a powered device (PD) over a link section. The power may be injected by an endpoint PSE at one end of the link section or by a midspan PSE along a midspan of a link section that is distinctly separate from and between the media dependent interfaces (MDIs) to which the ends of the link section are electrically- and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission and reception (collectively: "transceiving") of Ethernet packets with the transmission and reception of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, floating 48 Volt power currently available at a range of power levels from about 4 watts to about 15 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all-the same so that they can-achieve compatibility with each of the previously described variants.

Inline Power is also available through techniques that are non-IEEE 802.3 standard compliant as is well known to those of ordinary skill in the art.

In many cases where PDs are used, it may be desirable to provide some redundancy in terms of data and/or power delivery for cases in which equipment (hubs, switches, cable and the like) providing the power and/or data fails to continue to do so.

SUMMARY

A method and apparatus for redundant power and data over a wired data telecommunications network permits power to be received at a local powered device (PD) from remote power sourcing equipment (PSE) via at least one conductor at a first time and power and/or data to be obtained by the local device from another port of the remote device or another remote device at a second different time. Power levels obtained may be adjusted from time to time in response-to circumstances.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
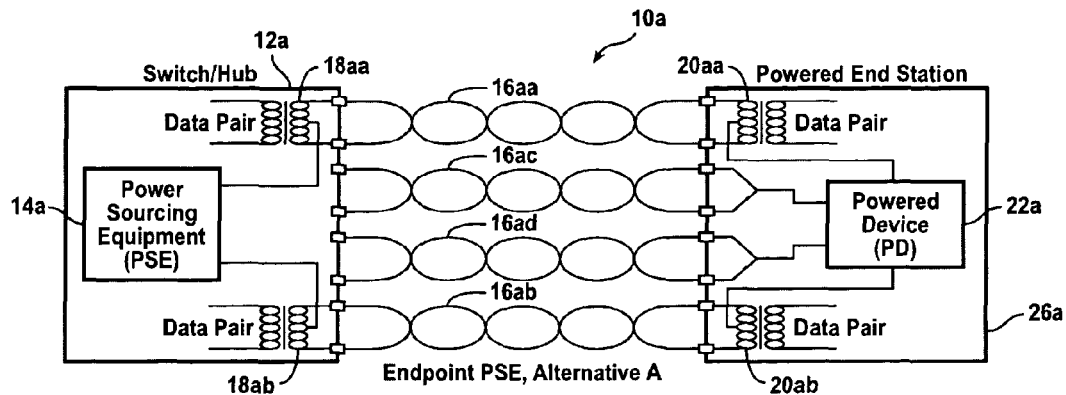
FIGS. 1A, 1B and 1C are electrical schematic diagrams of portions of data telecommunications networks in accordance with the prior art.
Figure 1B:
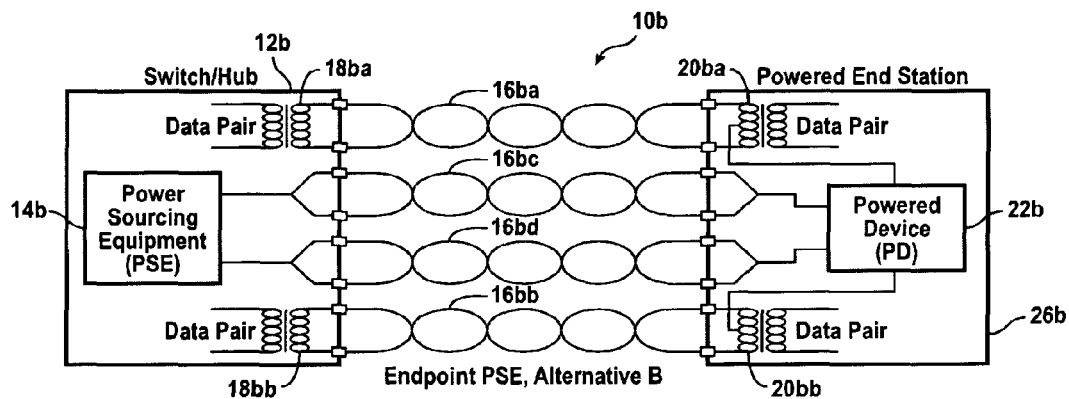

Embodiments of the present invention described in the following detailed description are directed at redundant power provided over Ethernet and similar cabled network connections. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, a networked device may have a data telecommunications port which may operate as a powered device (PD) under certain circumstances, may be off for power purposes under other circumstances and may operate as power sourcing equipment (PSE) under yet other circumstances. The same port may be a PD at one time and PSE at another time, and, if desired, off at yet another time.

Examples of applications where this invention may be used are a portable computing device such as laptop computer, personal data assistant (PDA), smart phone or similar device which may or may not be attached to an independent power supply (or may be configured to only receive power over a network connection). When the portable computing device is not connected to its own power supply it may have a data telecommunications port (such as an Ethernet port having a type RG-45 connector) configured to act as a PD and thereby receive power over a network connection with, for example, a network switch port configured as PSE. In this way the laptop may receive some power to charge its battery, or at least extend the amount of time it may be used before its power is exhausted (where it draws more power than can be provided over the inline power connection to the PSE). At other times the portable computing device may act as PSE to provide power back to the network (as in an emergency situation or as part of a power back-up system) or, for example, to another device coupled to the portable computing device such as a cell phone, smart phone, PDA or the like. In such a case the connected device could be connected to the portable computing device via Ethernet or some other wired data telecommunications protocol as will now be understood by those of ordinary skill in the art. Those of ordinary skill in the art will now also realize that these examples given here are merely examples and are not intended to limit the applicability of the present invention in any way and that the present invention has broad applicability to virtually all wired data telecommunications ports, particularly Ethernet ports.

Figure 2:
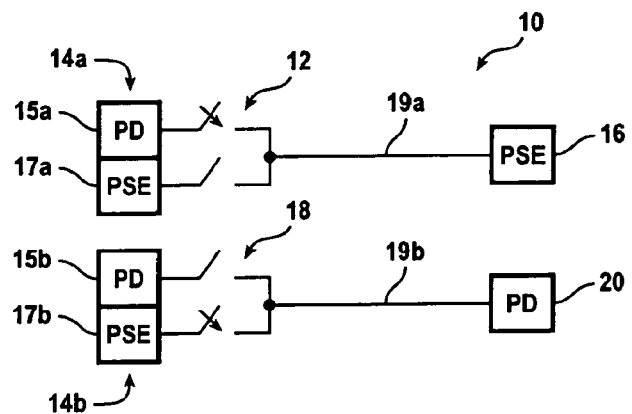
FIG. 2 is a block diagram showing a simplified view of a pair of configurations of media dependent interfaces (MDIs) for all connected devices and the cable connecting them in a data communications network segment in accordance with an embodiment of the present invention.

FIG. 2 is a block diagram showing a simplified view 10 of a pair of configurations of media dependent interfaces (MDIs) for all connected devices and the cable connecting them in a data communications network segment in accordance with an embodiment of the present invention. A first configuration 12 illustrates a shared MDI 14a having a switched PD functional block 15a shown in an on state and a switched PSE functional block 17a shown in an off state. These are coupled via cable 19a to a MDI 16 of a remote device configured as PSE. Alternately a second configuration 18 illustrates a shared MDI 14b having a switched PD functional block 15b shown in an off state and a switched PSE functional block 17b shown in an on state. These are coupled via cable 19b to a MDI 20 of a remote device configured as a PD. While typical use of this approach will be with conventional four-wire-pair Ethernet cable, for power transmission, all that is required is a cable over which power may be transmitted. This includes a single conductor with a power signal referenced to ground, or more conductors, as desired in a particular application. Note also that it is conceivable that a situation might arise in some context where it would be desirable for a port to, in effect, power itself and have the two states PD and PSE simultaneously active; similarly it might be desirable to have both the PD and PSE functional blocks switched to off so that the power functions of a port are off. These situations are intended to be within the scope of this disclosure and the appended claims.

Accordingly, a bidirectional inline power port at a fixed location or associated with a portable computing device may be configured to source power (PSE mode) or sink power (PD mode) depending upon the conditions presented. For example, a portable computing device at home, at work or onboard a transportation vehicle with an available PSE port may configure itself to operate in PD mode so as to charge its battery or obtain power for other purposes. When disconnected, the portable computing device may respond to a request for power from another attached PD and thereby change a configuration of its data telecommunications port from PD to PSE in order to provide power to the attached PD (such as a telephone, cell phone, PDA, or the like).

Figure 3:
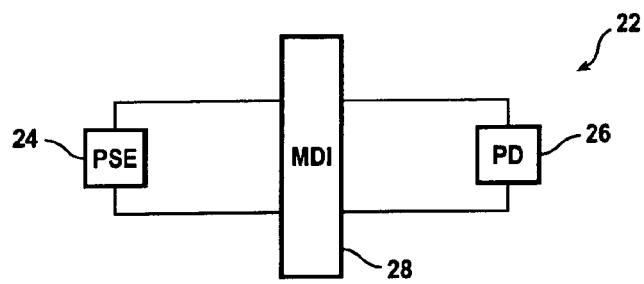
FIG. 3 is a block diagram illustrating a simplified design for a bidirectional inline power port in accordance with an embodiment of the present invention.

FIG. 3 is a block diagram illustrating a simplified design for a bidirectional inline power port 22 in accordance with an embodiment of the present invention which includes a PSE block 24, a PD block 26 and an MDI (media dependent interface) 28 such as a conventional Ethernet interface for coupling to data telecommunications network cabling. A single or a multiple MDI (using separate electrical connections) may be provided, as desired.

Figure 4:
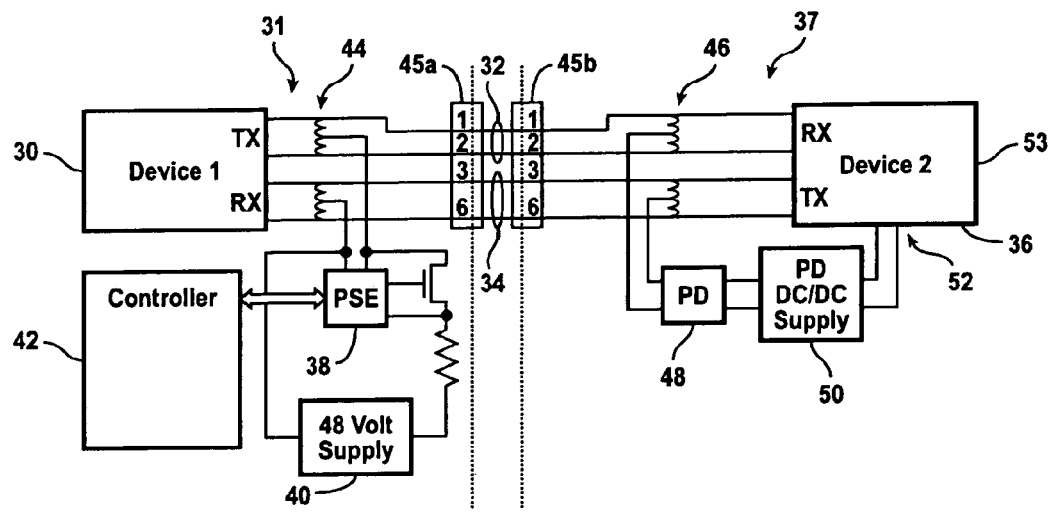
FIG. 4 is an electrical schematic diagram of a conventional inline power over Ethernet cabling set-up.

FIG. 4 is an electrical schematic diagram of a conventional inline power over Ethernet cabling set-up. In the FIG. 4 configuration, a first functional block 30 representing the data portion of a port of a first network device is coupled to first MDI 45a, and from first MDI 45a over (in this instance) two pairs of wires 32 and 34 to a second MDI 45b, and from there to a second functional block 36 representing the data portion of a port of a second network device. In this example the power portion of the first port (collectively 31) is always the PSE and the power portion of the second port (collectively 37) is always PD. PSE interface 38 is provided with an appropriate power supply 40 and operates under the control of controller 42. Controller 42, power supply 40 and PSE interface 38 are coupled to first MDI 45a over conventional IEEE 802.3af coupling 44 as shown. At second port 37 conventional IEEE 802.3af coupling is provided to couple the power from the second MDI 45b to a power portion of port 37 including a PD block 48 where the power is received and transmitted, if necessary, to a DC/DC power supply 50, and from there to a power input 52 for the second network device 53. Note that while controller 42 is shown closely associated with the port, that it need not be so, and the controller may be at some distance from, but coupled to the port over the wired data telecommunications network, or in some other conventional fashion, or the controller may comprise multiple parts, some of which are physically close to or a part of the port and some of which are physically remote therefrom, as at a switch, router, server, network control point, or the like.

Figure 5:
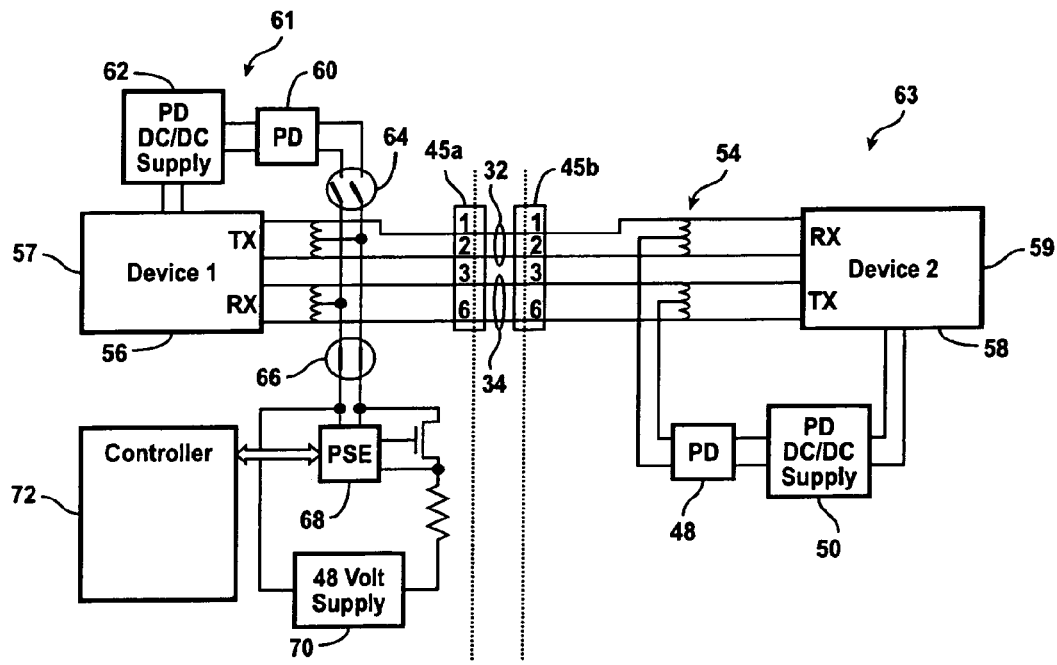
FIG. 5 is an electrical schematic diagram of a bidirectional inline power port configuration in accordance with an embodiment of the present invention.

FIG. 5 is an electrical schematic diagram of a bidirectional inline power port configuration 54 in accordance with an embodiment of the present invention. In this embodiment a first functional block 56 representing the data portion of a port 61 of a first network device 57 is coupled to first MDI 45a, and from first MDI 45a over (in this instance) two pairs of wires 32 and 34 to a second MDI 45b, and from there to a second functional block 58 representing the data portion of a port 63 of a second network device 59. In this instance port 61 may be configured as PD or PSE and port 63 may be configured as PD just as port 37 in FIG. 4. Port 61 includes a PD block 60 and a DC/DC converter block 62 just like port 37 of FIG. 4. In this case, however, switches (or other equivalent switching equipment such as diodes, transistors, relays and the like as will now be apparent to those of ordinary skill in the art) are provided to enable either the PD or the PSE (or neither or both) modes at port 61. Switching circuitry 64 selectively couples PD block 60 to first MDI 45*a*. Similarly, switching circuitry 66 selectively couples PSE block 68 (and power supply block 70) under control of controller 72 to first MDI 45*a*. Controller 72 or another controller (see discussion above) may monitor conditions such as a state of charge of a battery or availability of power received through PD block 60, or the like, to determine the state of switching circuitry 64 and 66 and hence the mode of operation of port 61. It is also possible and within the inventive concepts herein described to control the state of switching circuitry 64 and 66 directly in a conventional manner such as switches, hubs and the like are managed, e.g., by commands transmitted over the data communications network from a command center.

Figure 6:
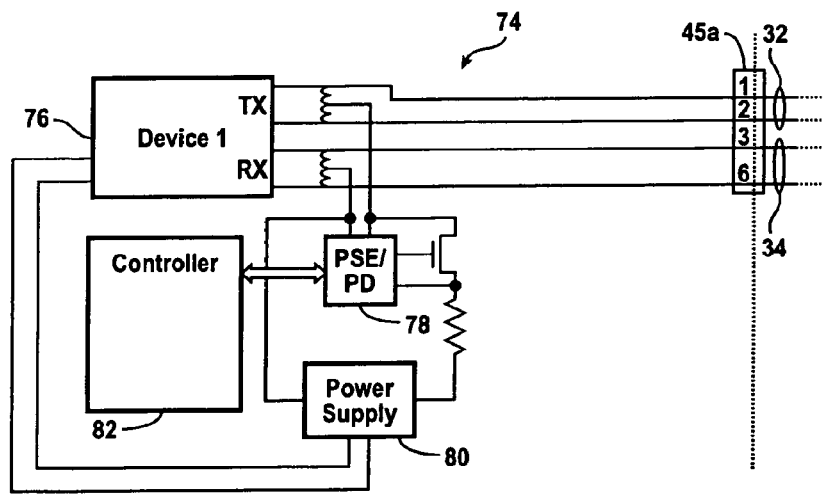
FIG. 6 is an electrical schematic diagram of a configuration of a bidirectional inline power port in accordance with an embodiment of the present invention.

FIG. 6 is an electrical schematic diagram of a configuration 74 of a bidirectional inline power port in which a port 76 of a first device is shown coupled for communication over cable pairs 32 and 34. An integrated PSE/PD block 78 coupled to receive power (when available) from power supply block 80 (which may be a conventional grid-powered or battery-powered power supply). Controller 82 controls operation of PSE/PD block 78 in response to monitored (or commanded) conditions as discussed above. In a first mode PSE/PD block 78 operates as a PSE. In a second mode PSE/PD block 78 operates as a PD. In a third optional mode PSE/PD block 78 may be turned off so that no inline power is passed and in a fourth optional mode PSE/PD block 78 may be set to be both PSE and PD.

Figure 7:
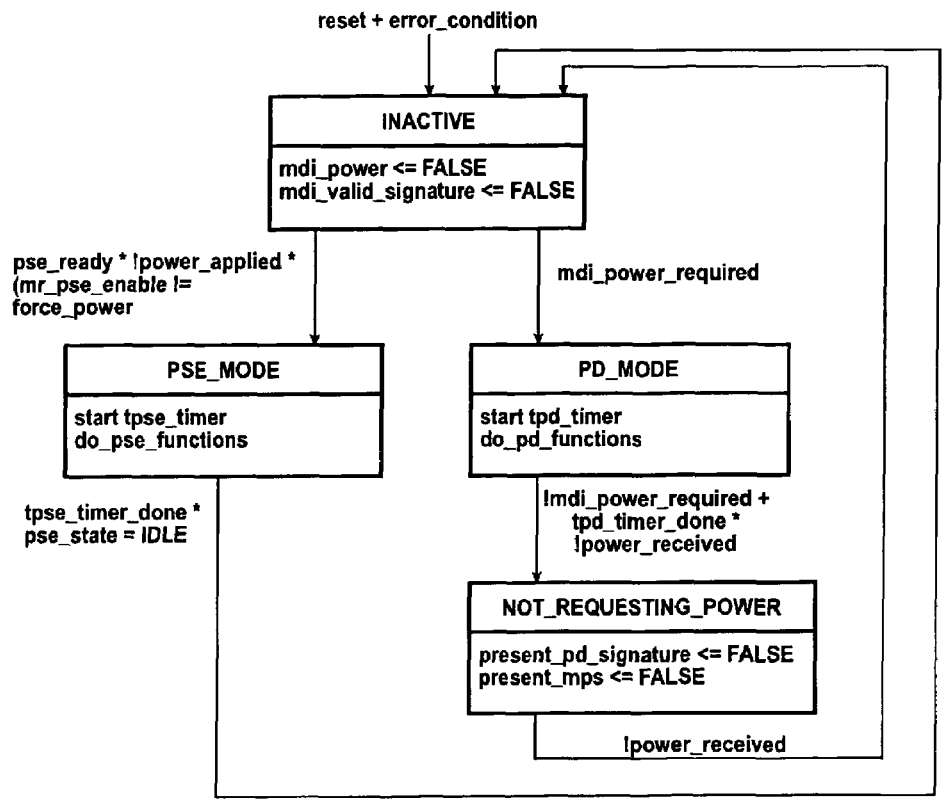
FIG. 7 is a flow diagram illustrating operation of the bidirectional inline power port in deciding which mode of operation to assert in accordance with an embodiment of the present invention.

FIG. 7 is a flow diagram illustrating operation of the bidirectional inline power port in deciding which mode of operation to assert. This program of instructions is executable by a machine and is illustrated in conventional pseudo-code similar to that used, for example, in the specification for IEEE 802.3af referred to above. It may now easily be implemented by those of ordinary skill in the art having the benefit of this disclosure in either hardware, software or firmware. In FIG. 7 the state PSE_MODE contains the IEEE 802.3af state machine for a PSE. The state PD_MODE contains the IEEE 802.3af state machine for a PD, with the state NOT_REQUESTING_POWER pulled out to show in this FIG. 7. The state is pulled out so that a new condition may be added (tpd_timer_done).

Within the INACTIVE state the system determines the needs for: PD, PSE, none and (if desired) PSE+PD operation. (While the PSE+PD mode of operation (switches 64 and 66 closed) represents a mode where the interface is, in effect, supplying power to itself and is an unlikely occurrence, it is still possible and might be desirable under certain circumstances and is thus described herein—in such a case it is desirable to provide switches which may be opened when appropriate to prevent power from being inserted onto the cable pairs—these could be located at the center-taps of the coupling transformers (not shown in FIG. 5)—or a separate path from the PSE to the PD—so that the cable does not have power on it when a remote device has not requested it). If power can be supplied by the device, the path to PSE_MODE is traversed. If power is required, then the path to PD_MODE is traversed. A different timer is used in each path to exit the path when the timer expires and no progress has been made entering the mode of operation attempted. This results in the INACTIVE state being entered where system needs are checked and prioritized before one of the modes is attempted again. The system is capable of manipulating the IEEE 802.3af variables to change the behavior of the IEEE 802.3af state machines.

The state of the port may also be managed by direct commands transmitted over the wired data communications network (or by other conventional means such as wireless) as from a conventional graphical user interface (GUI) or a command line interface (CLI) as are conventionally used to manage components of data communications networks. It is also possible to configure software to manage the state decision in response to various conditions as will now be apparent to those of ordinary skill in the art. It should be noted that the power requirements of a PD may change from time to time depending upon how it is used, or other time dependent operation of the device. As a result, it would be desirable to adjust the power provided to the PD from time to time to meet these new requirements, either by increasing the power provided or decreasing it, as appropriate. A number of mechanisms are provided by the present invention to accomplish this. First, the controller may direct a PSE block (see, e.g., FIG. 5) to reenter the INACTIVE state periodically to thereby reassess power demands and allocate power accordingly. Second, low bandwidth data communications may be established between a PSE and an attached PD so that the PD may communicate directly to the PSE its instantaneous power demands and the PSE may respond accordingly. Those of ordinary skill in the art will now realize that a number of known communications mechanisms may be used to modulate a data communication signal over the connecting cable, through the respective MDIs and between the PD and PSE without disrupting existing communications over the link. For example, a pulse-type communications signal could be transmitted between the PD and PSE to communicate current power requirements of the PD and/or power availability at the PSE to the PD. Third, in a similar fashion, the PD and PSE may establish communications over the data communications network to a control center, master controller or the like and tell it their respective power availabilities and power needs. In response the controller may command adjustments in provided power and/or desired power to the PSE or PD, respectively. Those of ordinary skill in the art will now realize that other equivalent mechanisms are available to periodically revise the amount of power made available by the PSE to the PD.

Figure 8A:
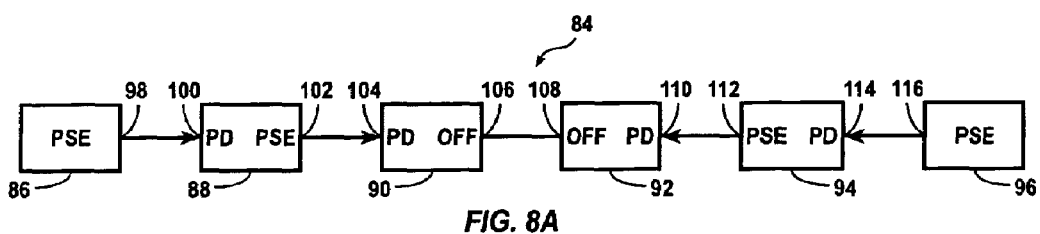
FIGS. 8A and 8B are block diagrams of a portion of a data telecommunications network configured and operating in accordance with an embodiment of the present invention.

Turning now to FIG. 8A, FIG. 8A is a block diagram of a portion 84 of a data communications network comprising a number of network devices 86, 88, 90, 92, 94 and 96. Each of the network devices has at least one port for carrying out data telecommunications and/or inline power transmission. Device 86 has at least first port 98. Device 88 has at least second and third ports 100 and 102. Device 90 has at least fourth and fifth ports 104 and 106. Device 92 has at least sixth and seventh ports 108 and 110. Device 94 has at least eighth and ninth ports 112 and 114 and device 96 has at least tenth port 116. Note that at least network devices 86 and 96 could be the same device and/or may have uplink(s) to another network such as an intranet, the internet, and the like.

This data communications network is configured so that there is redundant data and redundant inline power available so that the normal effects (e.g., data interruption, power interruption) of a cut in the cabling coupling the devices together may be avoided. In FIG. 8A port 98 of device 86 is configured PSE and feeds power and communicated data with port 100 of device 88. Device 88 provides internal coupling of data to port 102. Port 100 is configured as PD to receive power from port 98 and port 102 is configured PSE to provide power to PD-configured port 104 of device 90. Port 106 of device 90 is configured so that inline power is off (but data may be communicated) as is port 108 of device 92. The rest of the ports are similarly configured as indicated in FIG. 8A.

Figure 8B:
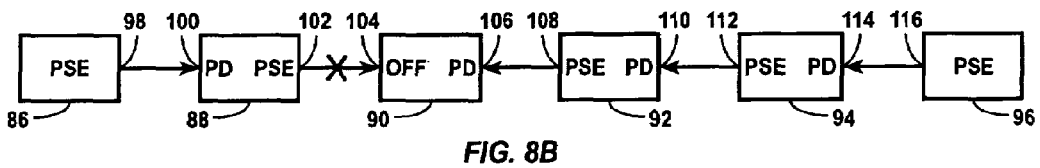

Turning now to FIG. 8B we see that the cabling has been cut or disrupted in some fashion between port 102 and port 104. In this case, since port 104 can no longer receive inline power from port 102, it has been reconfigured so that inline power is off. (Note that the PD/PSE functions of ports may be configured as required by the controller. For example, in this case port 102 might not be set to off if it still required power from a PSE and it was configured to "look" like a PD.) Port 106 which had been off in FIG. 8A is now reconfigured to receive power in PD mode. Port 108 which had been off is now reconfigured in response to the demand from port 106 in PD mode so that it is now in PSE mode. The balance of the network inline power ports remain unchanged. In this manner a single severed network connection will not necessarily result in inline powered equipment being forced to shut down. Similarly, the Ethernet connections may still reach all connected network devices and conventional network protocols such as the well-known Spanning Tree Protocol (STP) and the like will adapt the network to the new cabling configuration.

It is also within the scope of this invention to provide bidirectional midspan power, e.g., a power injector which may act as PSE to either an "upstream" or "downstream" device but not necessarily carrying out any data operations. This would be useful, for example, in long cable runs where power losses in the cable become significant. Such an arrangement would also be useful to provide backup sources of power to a network at locations where power happens to be available, such as generator-supplied power or emergency power, or the like. Similarly, it is possible to provide power storage devices, such as batteries or large capacitors, or the like, on board a network device or power injector. Acting as a PD the power storage device may be charged by the power available on the network (or it may be charged locally by connection to another power source). When another device communicates a desire to act as a PD, the power storage device may switch modes to PSE to provide power to the other device. This approach also allows a device with a first average power requirement and a second, higher, low duty cycle power requirement to classify itself with the first lower power requirement (avoiding locking up mostly unneeded system power resources) while making up the peak power requirement with a power storage device located in the device or some other device which can act as a PSE to the device for this purpose.

Since most data communications network operations are considered critical by at least some user, preventing those functions from becoming unavailable is important. Beyond careful attention to component design, redundant components can provide an additional measure of safety. In a network setting, however, insuring that such redundant components may operate in a desired manner, rather than in a conflicting manner can present a challenge. Inline power is becoming such a critical function. Utilizing the bidirectional inline power port detailed above to provide components with redundant inline power capabilities in a network setting is made much easier.

The main ideas here are (1) to provide a primary inline power port to supply power to a device and to provide a secondary inline power port that can be configured to provide inline power to that device should the primary inline power port fail to do so (examples of such failures include the cutting or inadvertent disconnection of a network pathway); (2) upon loss of power from a primary PSE, reconfiguring a secondary port to become a PD; and (3) upgrading or renegotiating a power class of a PD in response to a power failure. In the first and second case, a network device receiving inline power as a PD will have at least two ports (primary PD port and secondary PD port) over which power may be received. The primary PD port will be coupled to a primary PSE over the network and the secondary PD port will be coupled to a secondary PSE over the network. Typically the secondary PD port will not be configured as a PD while it is not being used (although it may be as described below) and the secondary PSE will not be configured to transmit power since the port to which it is coupled is not requesting power as a PD. If the primary PSE becomes unavailable (ceases providing power to the primary power reception port), than the secondary PD port goes active and requests power from the PSE which is, in turn, activated so as to cause power to be received at the secondary PD port. In the third case, a network device may have two (or more) ports configured as PDs. In accordance with the IEEE 802.3af standard, each inline power coupling has a class associated with it. The classes under IEEE 802.3af are Class 0, 1, 2, 3 and 4. Classes 0, 3 and 4 (under the current version of the standard) have a minimum power level at the output of the PSE of 15.4 Watts (W). Class 1 is 4 W and Class 2 is 7 W. In this case, if, say, both PD ports at the network device are configured as, say, Class 2 and are receiving roughly 7 watts (less line losses) each, and one fails, the other can be "upgraded" to class 0, 3 or 4 to receive roughly 15.4 W which will make up for the loss of the other port. Note that these goals may be accomplished with ports that are capable of assuming one of a number of states, e.g., PD, PSE, OFF, or with more conventional ports that may be fixed as to state and not reconfigurable.

Figure 9A:
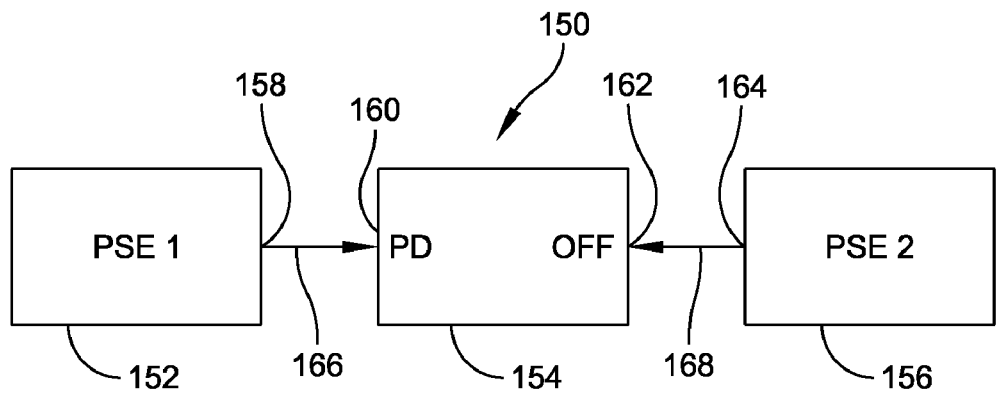
FIGS. 9A and 9B are block diagrams illustrating a network segment under normal conditions (FIG. 9A) and in the presence of a link failure (FIG. 9B) in accordance with an embodiment of the present invention.
Figure 9B:
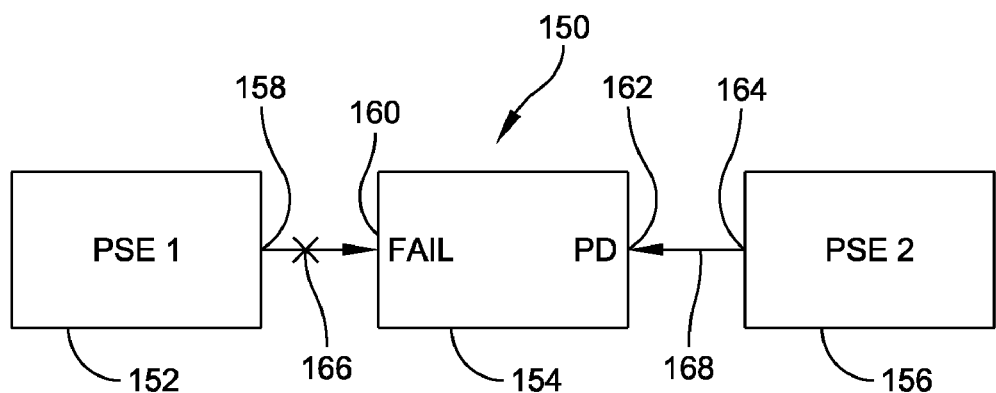

Turning now to FIGS. 9A and 9B, FIG. 9A is a block diagram illustrating a network segment 150 in accordance with an embodiment of the present invention comprising a first network device 152 designated PSE1, a second network device 154 and a third network device 156 designated PSE2. In the embodiment of FIG. 9A a primary inline power port 158 of PSE1 provides inline power over a wired link 166 to port 160 of network device 154 (configured as PD). Secondary inline power port 164 of PSE2 is coupled over link 168 to port 162 of network device 154. Here port 162 is configured OFF for inline power purposes. Accordingly, all inline power in this example is provided from PSE1 to network device 154 over link 166.

Now, suppose that someone were to disconnect link 166, or its power capabilities were lost, or link 166 were simply cut in some fashion. Power would no longer be available over link 166 to network device 154. This scenario is illustrated in block diagram form in FIG. 9B by the "X" in link 166. In this case the failure of link 166 would be detected in any of a number of ways, and network device 154 would be reconfigured so that port 160 is no longer PD (or anything that the systems requires) and port 162 is switched from OFF to PD so that it can now receive power over link 168 from PSE2 as shown. As discussed above, such detection and reconfiguration may be done locally at the network device, or at a master control with appropriate instructions communicated to the network device, or the like. In this way it is possible to design a system with a preference for receiving power on port 160 while obtaining it from port 162 (when necessary). Then, if power is restored to port 160 it can reconfigure its power utilization as desired from ports 160 or 162 or both.

Figure 10A:
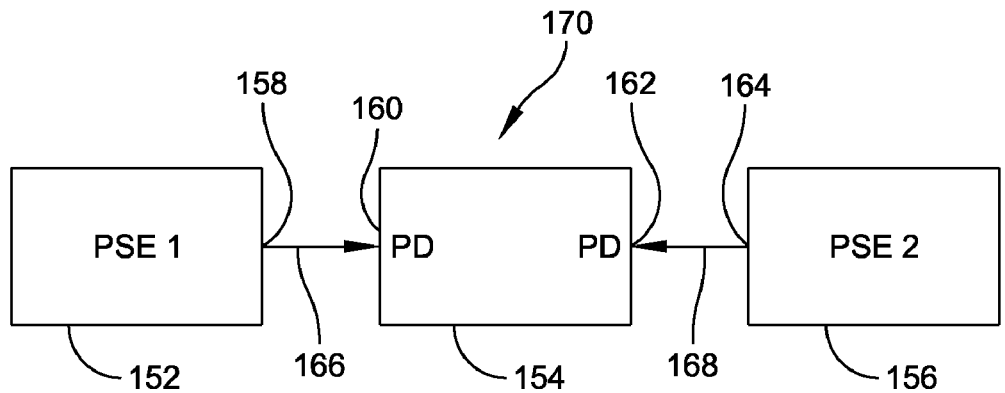
FIGS. 10A and 10B are block diagrams illustrating a network segment under normal conditions (FIG. 10A) and in the presence of a link failure (FIG. 10B) in accordance with an embodiment of the present invention.
Figure 10B:
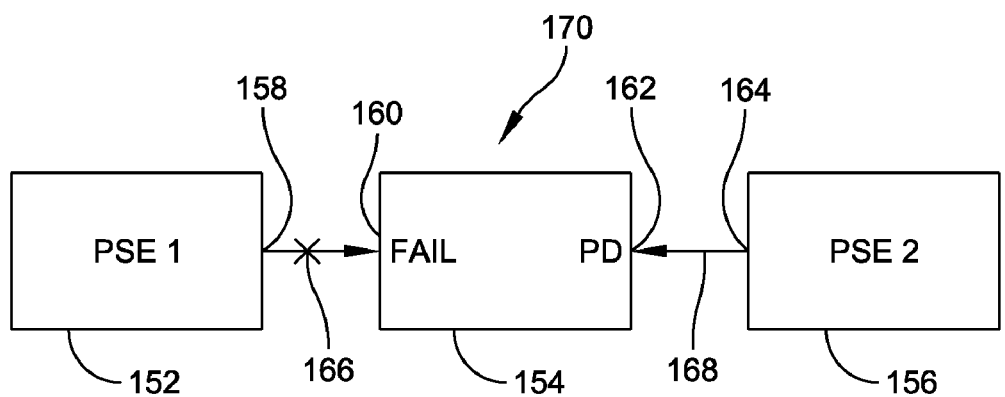
Figure 11A:
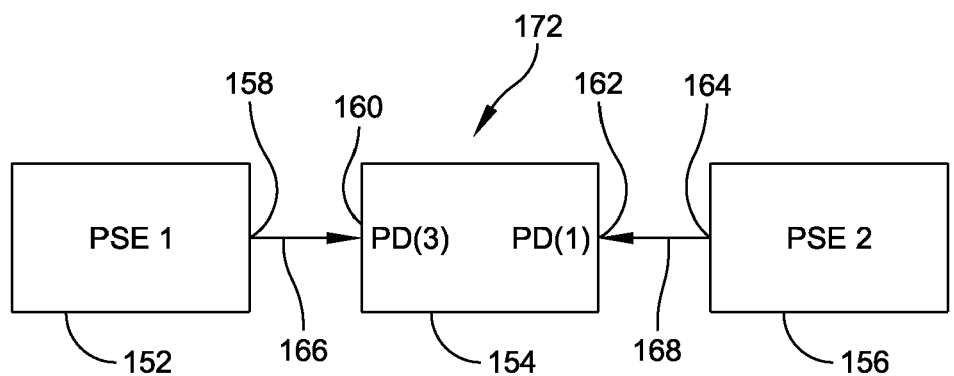
FIGS. 11A and 11B are block diagrams illustrating a network segment under normal conditions (FIG. 11A) and in the presence of a link failure (FIG. 11B) in accordance with an embodiment of the present invention.
Figure 11B:
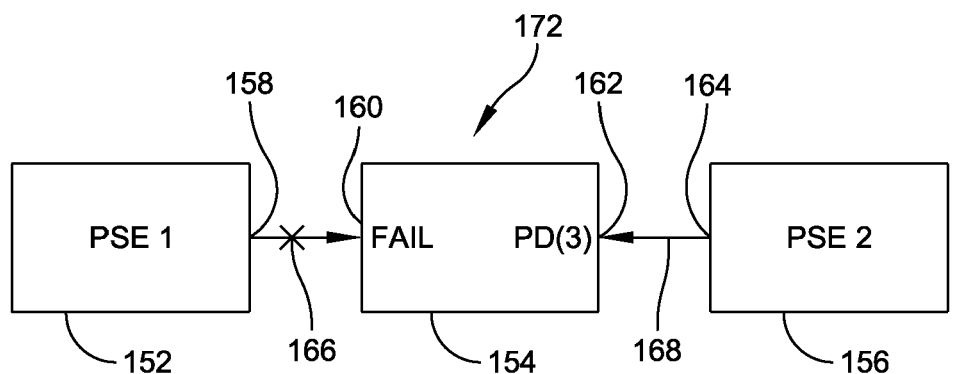

In another example, FIGS. 10A and 10B are block diagrams illustrating a network segment 170 in accordance with an embodiment of the present invention which differs somewhat from that of FIGS. 9A and 9B as follows: In the embodiment of FIG. 10A, before link 166 is cut, both ports 160 and 162 of network device 154 are configured as PD and receive power from PSE1 and PSE2 over links 166 and 168, respectively. The network device may request the same class of service from both PSE 1 and PSE2, it may get all of its power from one or the other, or it may load balance power from both PSE1 and PSE2 in some appropriate fashion. In the embodiment of FIG. 10B, link 166 has been cut as before and the network device 154 must get all of its inline power from PSE2. This may, if required, involve a renegotiation of the class for the port 162-port 164 link 168 which is the scenario illustrated in network segment 172 of FIGS. 11A and 11B. In FIG. 11A port 160 is configured PD(3) (Class 3 or 15.4 W) and port 162 is configured PD(1) (Class 1 or 4 W). Thus the network device is receiving some power over link 166 and some other power at a different level over link 168. When link 166 goes down, as illustrated in FIG. 11B, more power can be received over link 168 by "upgrading" its class in response to the failure of link 166.

Note that it should be understood that the IEEE 802.3af standard may be amended in the future to provide for more power, different classes, and the like. For example, it is anticipated at present that Class 4 will be raised to approximately 30 watts. Additionally, devices that may maintain interoperability by adherence to the 802.3af standard may also detect devices which are "more than compliant" with the 802.3af standard so that additional power may be transmitted over links or different power levels may be transmitted than just the three levels currently provided.

While it is desirable to provide redundant power in the inline power context as described above, it is also desirable to provide redundant data paths so that a link failure will have no adverse affect on a user. We turn now to several techniques which may now be used to provide simultaneous redundancy in both the data and inline power areas.

Figure 12A:
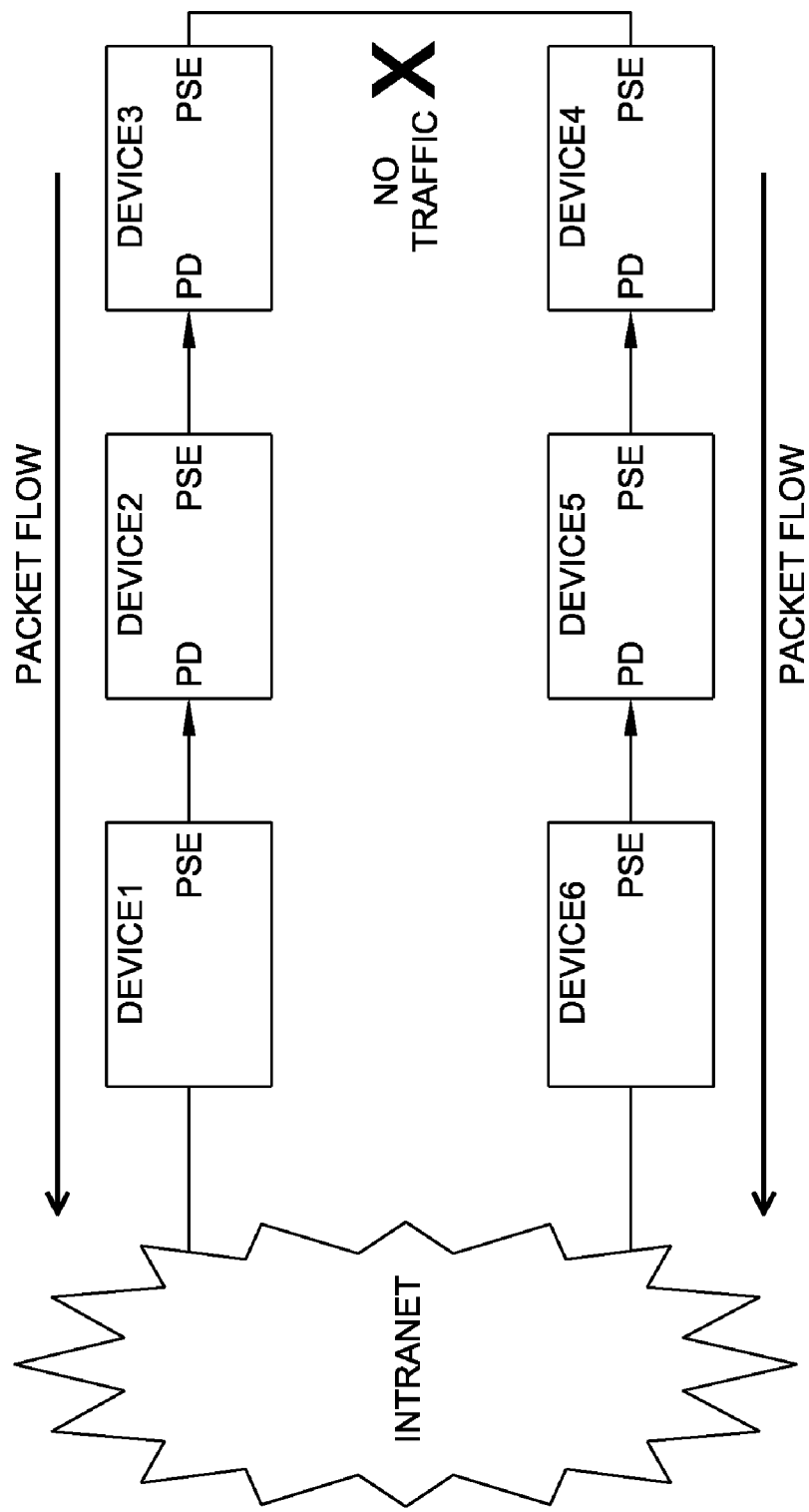
FIGS. 12A and 12B are block diagrams illustrating a network segment under normal conditions (FIG. 12A) and in the presence of a link failure (FIG. 12B) in accordance with an embodiment of the present invention.
Figure 12B:
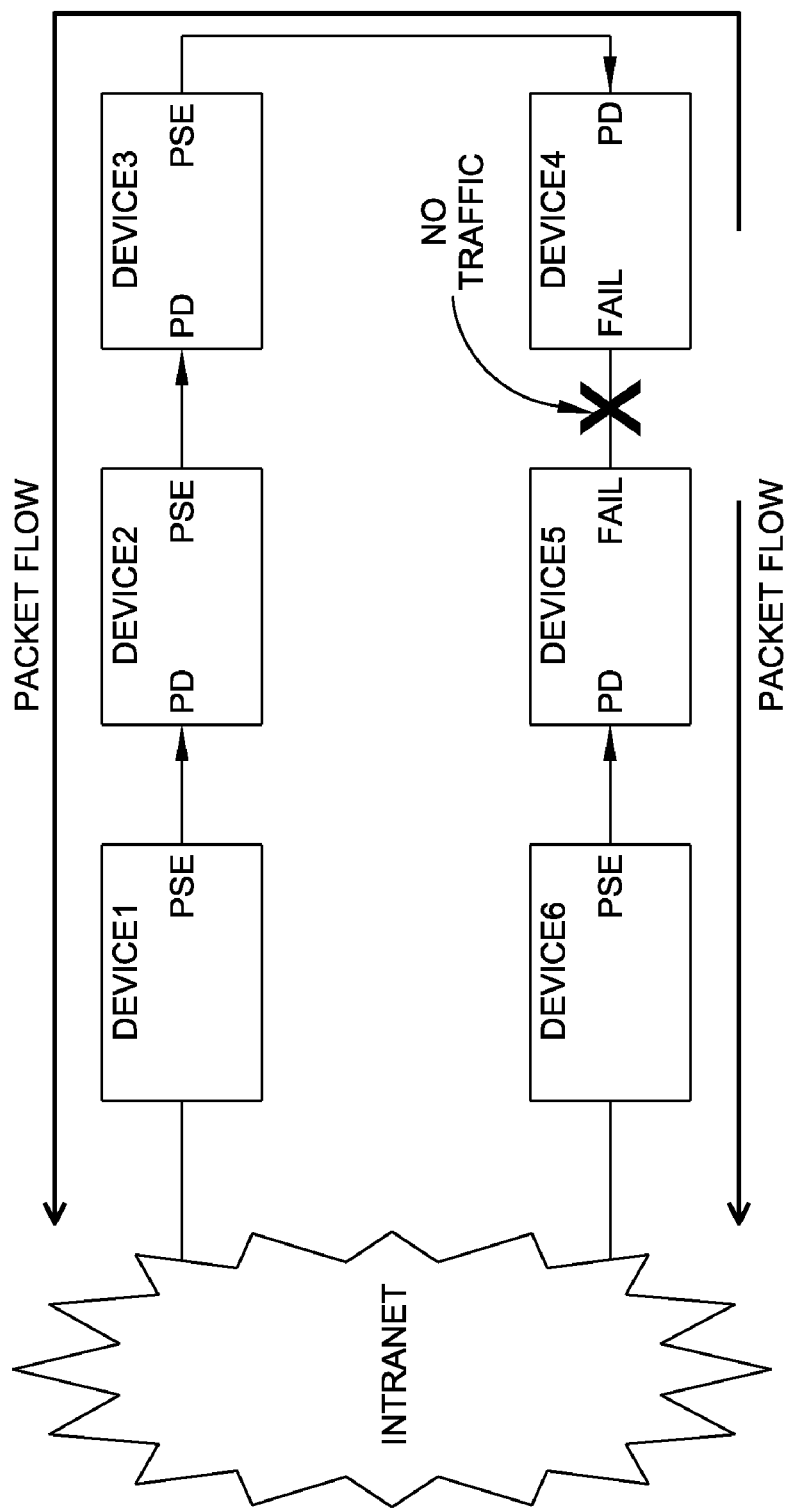

FIGS. 12A and 12B are block diagrams illustrating a network segment under normal conditions (FIG. 12A) and in the presence of a link failure (FIG. 12B) in accordance with an embodiment of the present invention. In accordance with the embodiment illustrated in FIG. 12A, inline power flows from Device 1 (PSE) to Device 2 (PD), Device 2 (PSE) to Device 3 (PD), Device 6 (PSE) to Device 5 (PD) and Device 5 (PSE) to Device 4 (PD) as discussed above. Since Device 3 and Device 4 PSE ports are coupled together as shown and neither is a PD, there is no power flow at this time. Packet flow is from Device 3 to Device 2 to Device 1 and Device 4 to Device 5 to Device 6 as shown with no packet traffic between Device 3 and Device 4 (although a link between Device 3 and Device 4 is present and could potentially be used). Packets can flow in either direction, but to prevent loops the conventional well known Spanning Tree Protocol (STP) prevents packet loop flow. Note that Device 1 and Device 6 each are coupled to the "Intranet". This "Intranet" can be, in reality, any uplink to another network segment—such as the "Internet", a corporate wide, metropolitan or local area network, or the like. It could be implemented with a switch or router or other conventional network device such as a firewall or the like. Turning now to FIG. 12B, an interruption has occurred at the "X" causing the link between Device 5 and Device 6 to fail—thus no power and no packet traffic exists on that link. In response to the failure, detected by conventional means well known to those of ordinary skill in the art, the Device 4 PSE port is converted to PD so that it may receive power from Device 3's PSE port, STP recalculates to establish new packet flow paths so that packets from and to Device 4 now traverse Device 3, and Device 5's PSE detects the failure and stops providing power to the failed link.

Figure 1C:
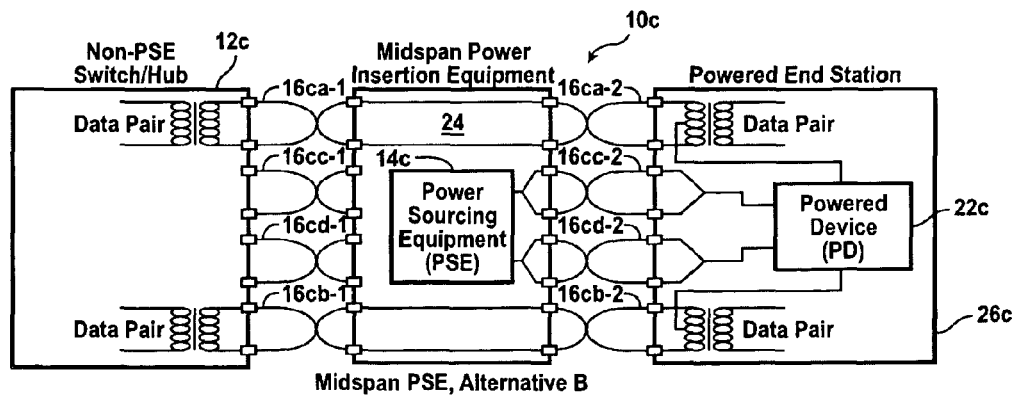
Figure 13A:
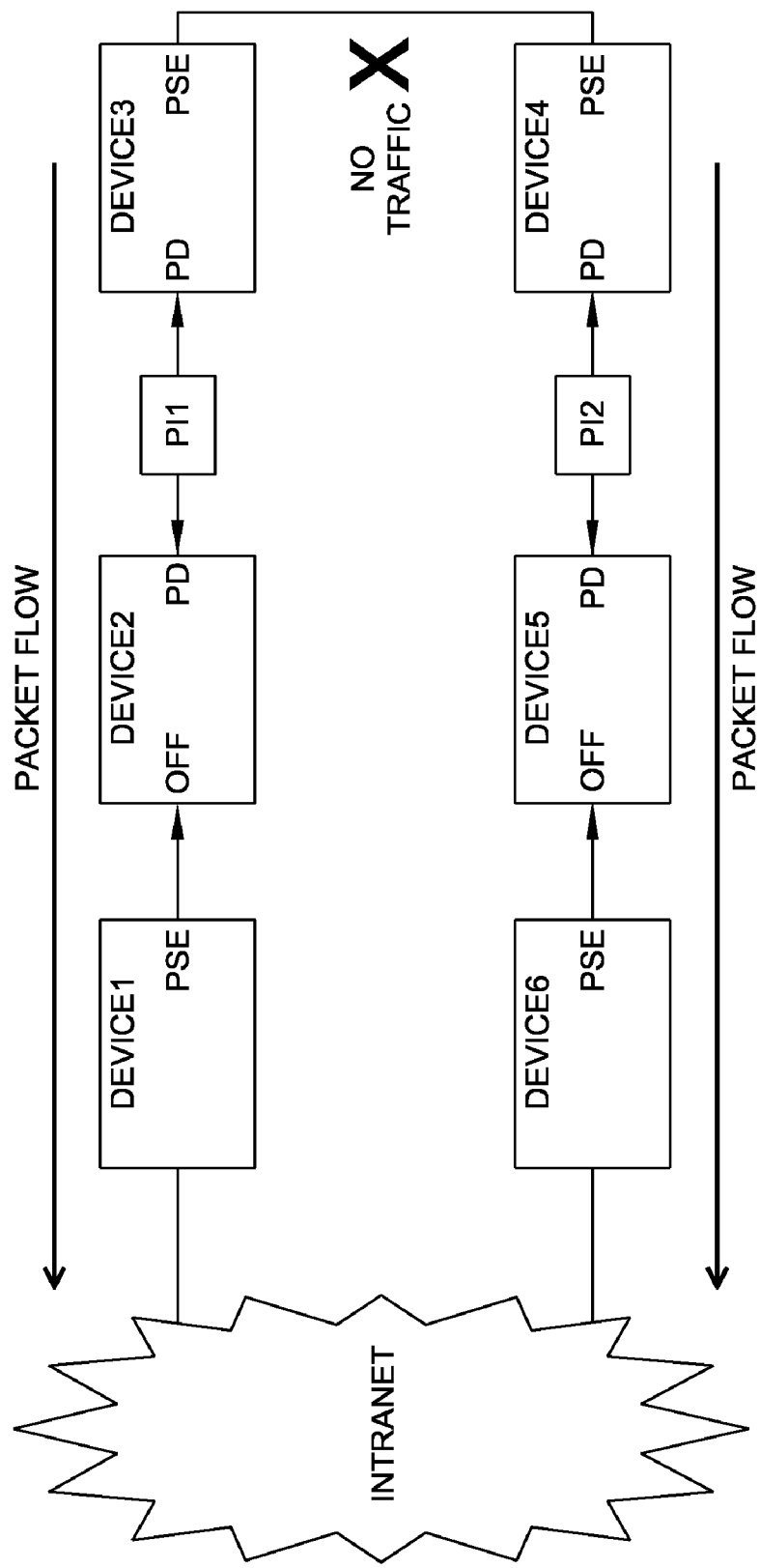
FIGS. 13A and 13B are block diagrams illustrating a network segment under normal conditions (FIG. 13A) and in the presence of a link failure (FIG. 13B) in accordance with an embodiment of the present invention.
Figure 13B:
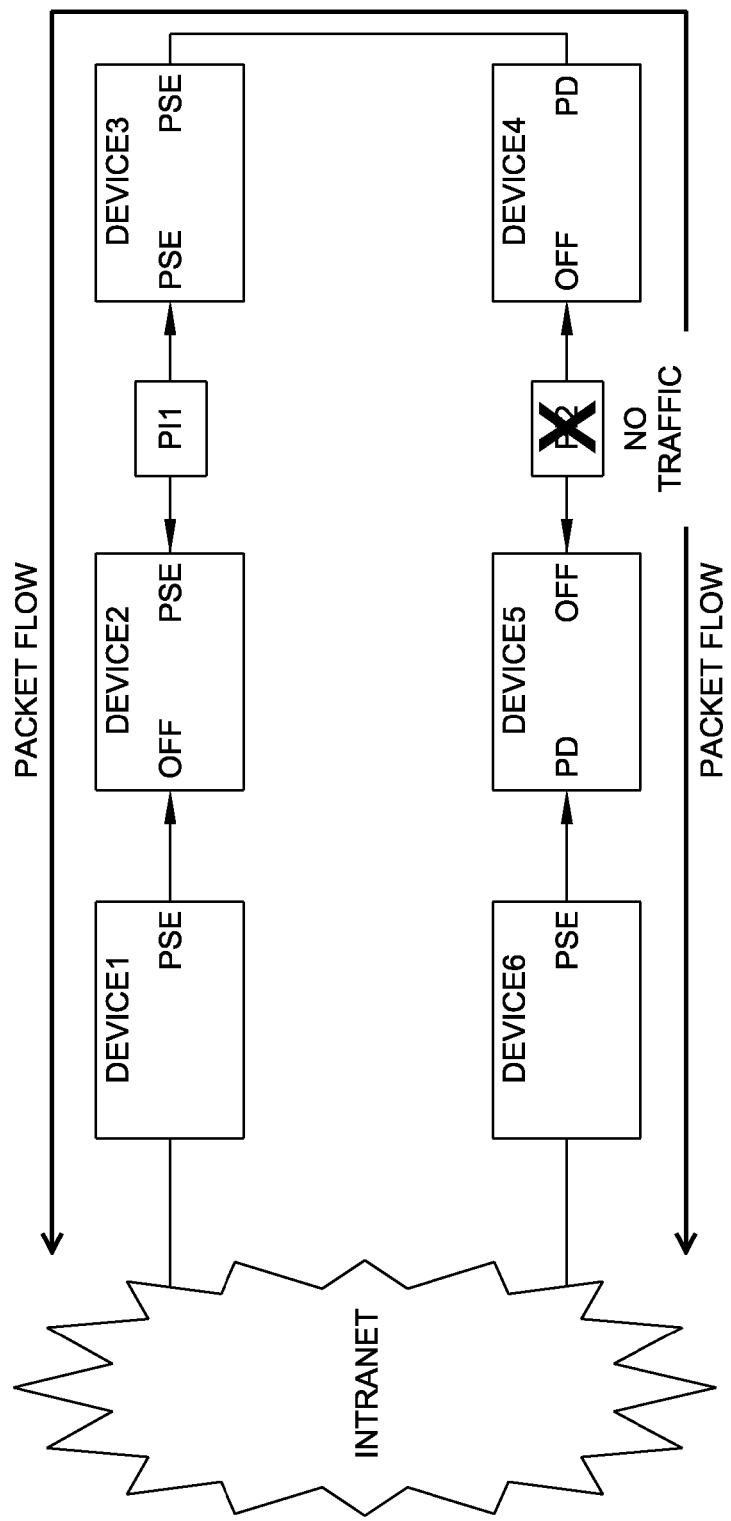

Turning now to FIGS. 13A and 13B, FIGS. 13A and 13B are block diagrams illustrating a network segment under normal conditions (FIG. 13A) and in the presence of a link failure (FIG. 13B) in accordance with an embodiment of the present invention. In accordance with this embodiment, inline power injectors are added to the ring configuration illustrated in FIGS. 12A and 12B. Inline power injectors, denoted by the symbols PI1 and PI2 (first and second power injectors) add some redundancy to the power distribution among network devices disposed in the ring configuration since power can flow both ways (clockwise and counterclockwise) on the ring. Inline power injectors are also useful as an alternative to environmentally hardened, IP67-rated switches. Such switches tend to be expensive and the ability to place midspan power injectors with bidirectional capabilities can, in some situations, obviate the need for this expensive alternative. These power injectors operate somewhat differently from conventional midspan power sourcing/insertion equipment (see, e.g., FIG. 1C). In accordance with the present invention power may be provided out of one or both (upstream and downstream) ports and data may flow through it as well. Thus each port (upstream and downstream) operates as a midspan device. Comparing the operation of the configuration of FIG. 13A to that of FIG. 12A, power flows from Power Injector 1 (IP1) to Device 2 (PD) and Device 3 (PD). Similarly, power flows from Power Injector 2 (IP2) to Device 4 (PD) and Device 5 (PD). Otherwise, conditions are as in the embodiment of FIG. 12A. In FIG. 13B, PI2 has failed or both of its links have failed. Consequently Device 4 and 5 may no longer receive power from PI2, consequently Device 5 takes a port previously labeled OFF and switches it to PD mode to receive power in the other direction from Device 6 (PSE). Similarly, Device 4 switches the port coupled to PI2 to OFF and the port that previously was PSE to PD so that it can receive power from Device 3 (PSE). In the case where packet traffic is also blocked at PI2, STP may recalculate the traffic paths so that packets are able to flow among Devices 4, 3, 2 and 1 and among Devices 5 and 6.

Note that in this situation: (1) network devices may be anywhere supported by the 802.3af specification and thus may be in different buildings; (2) the "Intranet" shown in FIGS. 12A, 12B, 13A and 13B may be a switch or router; (3) power injector failure may be due to loss of power in a section of a factory or building; and (4) the power injector may or may not be able to pass packet traffic during a condition where it is not providing power to the link.

It should be noted that while certain circuitry has been shown in the configurations of the PSE/PD ports, any circuitry suitable to carry out the functions specified may be used and the implementation of such circuitry in any number of various forms is well within the skill of those of ordinary skill in the art having the benefit of this disclosure. It should also be noted that while in several contexts the "disruption" of power and/or data to a port of a network device has been discussed as a precursor to a switching event to reconstitute data and/or power over wired network service to a particular port, the disruption or the switching event in the absence of a disruption could be caused by a command to the network device from a control point such as a master control center or other control location, a hardware or software failure, deliberate (or inadvertent) de-powering of a device, or from any other cause.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A method of providing redundant power over a wired data telecommunications network, the method comprising:
configuring a first device having a first network port and a second network port, the first and second network ports configurable to be one of at least power sourcing equipment (PSE) and a powered device (PD);
configuring the first network port to be a PD and the second network port to be a PD;
requesting a first amount of power to be provided to the first network port and a second amount of power to be provided to the second network port; and
subsequently detecting an event at the first port, and, responsive thereto, requesting a third amount of power different from the second amount of power to be provided to the second network port.

2. The method of claim 1, wherein the event corresponds to a command sent to at least one of the first device and a second device and a third device from a control point.

3. The method of claim 1, wherein the event corresponds to a link failure between the first network port of the first device and a first network port of a second device.

4. The method of claim 3, wherein the link failure is due to a disconnected network cable.

5. The method of claim 3, wherein the link failure is due to a severed network cable.

6. The method of claim 1, wherein the event corresponds to a reduction in the power received by the first network port of the first device.

7. The method of claim 1, wherein the event corresponds to a loss of data connectivity at the first network port of the first device.

8. The method of claim 1, wherein the event corresponds to both a loss of data connectivity and a reduction in the power received at the first network port of the first device.

9. An electronic device, comprising:
a first data telecommunications port constructed and arranged to couple to first power sourcing equipment;
a second data telecommunications port constructed and arranged to couple to second power sourcing equipment; and
electronic circuitry coupled to the first and second data telecommunications ports, the circuitry being constructed and arranged to:
configure the first data telecommunications port to operate as a powered device (PD) port with respect to the first power sourcing equipment,
while the first data telecommunications port is configured as a PD port, configure the second data telecommunications port to operate as a PD port with respect to the second power sourcing equipment, and
in response to an event relating to the first data telecommunications port, changing an amount of power consumed from the second power sourcing equipment.

10. An electronic device as in claim 9 wherein the electronic circuitry, when configuring the first data telecommunications port to operate as a PD port with respect to the first power sourcing equipment, the electronic circuitry negotiates, via data communications through the first data telecommunications port, delivery of power from the first power sourcing equipment through the first data telecommunications port in accordance with pre-established power classes;
wherein the electronic circuitry, when configuring the second data telecommunications port to operate as a PD port with respect to the first power sourcing equipment, the electronic circuitry negotiates, via data communications through the second data telecommunications port, delivery of power from the second power sourcing equipment through the second data telecommunications port in accordance with the pre-established power classes; and
wherein the electronic circuitry, when changing the amount of power consumed by the electronic device from the second power sourcing equipment in response to the event relating to the first data telecommunications port, the electronic circuitry renegotiating, via data communications through the second data telecommunications port, delivery of power from the second power sourcing equipment through the second data telecommunications port to change operation from a first pre-established power class to a second pre-established power class, the first pre-established power class defining a first amount of power, and the second pre-established power class defining a second amount of power which is different than the first amount of power.

11. An electronic device as in claim 9 wherein the electronic device consumes a first amount of power from the first power sourcing equipment and concurrently consumes a second amount of power from the second power sourcing equipment, the first amount of power being different than the second amount of power.

12. An electronic device as in claim 11 wherein the electronic device, when consuming the first amount of power from the first power sourcing equipment and concurrently consuming the second amount of power from the second power sourcing equipment, uses at least 30 Watts of power in total through the first and second data telecommunications ports.

13. An electronic device as in claim 9 wherein the first and second data telecommunications ports belong to a set of data telecommunications ports of the electronic device; and
wherein the electronic circuitry is constructed and arranged to configure at least one data telecommunications port of the set of data telecommunications ports to operate as a power sourcing equipment port.

14. An electronic device as in claim 13, further comprising:
a power storage device coupled to the electronic circuitry, the electronic circuitry being constructed and arranged to store power supplied by the first and second power sourcing equipment through the first and second data telecommunications ports in the power storage device.

15. An electronic device as in claim 13 wherein the electronic circuitry is further constructed and arranged to supply power from the power storage device to an external powered device through at least one data telecommunications port of the set of data telecommunications ports operating as a power sourcing equipment port.

16. An electronic device as in claim 13 wherein the electronic circuitry is further constructed and arranged to discontinue operating at least one data telecommunications port of the set of data telecommunications ports as a power sourcing equipment port.

17. A method of operating an electronic device on a wired data telecommunications network, the method comprising:
configuring a first data telecommunications port of the electronic device to operate as a powered device (PD) port with respect to first power sourcing equipment coupled to electronic device through the first data telecommunications port;
while the first data telecommunications port is configured as a PD port, configuring a second data telecommunications port of the electronic device to operate as a PD port with respect to second power sourcing equipment coupled to electronic device through the second data telecommunications port; and in response to an event relating to the first data telecommunications port, changing an amount of power consumed by the electronic device from the second power sourcing equipment.

18. A method as in claim 17 wherein configuring the first data telecommunications port of the electronic device to operate as a PD port with respect to the first power sourcing equipment includes negotiating, via data communications through the first data telecommunications port, delivery of power from the first power sourcing equipment to the electronic device through the first data telecommunications port in accordance with pre-established power classes;

wherein configuring the second data telecommunications port of the electronic device to operate as a PD port with respect to the second power sourcing equipment includes negotiating, via data communications through the second data telecommunications port, delivery of power from the second power sourcing equipment to the electronic device through the second data telecommunications port in accordance with the pre-established power classes; and wherein changing the amount of power consumed by the electronic device from the second power sourcing equipment in response to the event relating to the first data telecommunications port includes renegotiating, via data communications through the second data telecommunications port, delivery of power from the second power sourcing equipment to the electronic device through the second data telecommunications port to change operation from a first pre-established power class to a second pre-established power class, the first pre-established power class defining a first amount of power, and the second pre-established power class defining a second amount of power which is different than the first amount of power.

19. A method as in claim 17, further comprising:

consuming, by the electronic device, a first amount of power from the first power sourcing equipment and concurrently consuming, by the electronic device, a second amount of power from the second power sourcing equipment, the first amount of power being different than the second amount of power.

20. A method as in claim 19 wherein consuming the first amount of power from the first power sourcing equipment and concurrently consuming the second amount of power from the second power sourcing equipment includes uses at least 30 Watts of power in total through the first and second data telecommunications ports.

* * * * *